C. BEARENS.
TRANSMISSION GEAR.
APPLICATION FILED JULY 15, 1921.

1,420,514.

Patented June 20, 1922.

WITNESSES
Frederick Diehl.

INVENTOR
CLAUDE BEARENS
BY
ATTORNEYS

UNITED STATES PATENT OFFICE.

CLAUDE BEARENS, OF NEW YORK, N. Y.

TRANSMISSION GEAR.

1,420,514.   Specification of Letters Patent.   Patented June 20, 1922.

Application filed July 15, 1921. Serial No. 484,995.

*To all whom it may concern:*

Be it known that I, CLAUDE BEARENS, a citizen of the United States, and a resident of the city of New York, borough of Manhattan, in the county and State of New York, have invented a new and Improved Transmission Gear, of which the following is a description.

My invention relates to a transmission gear embodying means whereby to effect an automatic gear shift so that in overcoming inertia in starting or in overcoming resistance as in hill climbing, or otherwise running under a heavy load, under direct drive and high speed, should the speed be too high for starting or overcoming resistance without shock, the gearing will be automatically thrown out of high gear and into a lower gear.

The present invention which is intended as an improvement on the transmission gear shown in applications filed by me May 8, 1920, Serial Number 329,848, and Serial Number 434,890, filed January 4, 1921, has more particularly for an object to provide for automatically throwing the gearing successively into an intermediate speed and low speed to overcome the load.

More particularly, the invention has for an object to improve the automatic shift features whereby the transmission will be thrown into intermediate gear for the starting of the car and if the resistance be too great, there will be an automatic shift to low gear, the assemblage including also a high gear direct drive arrangement which is automatically brought into action as the momentum is acquired.

Reference is to be had to the accompanying drawings forming part of this specification, it being understood that the drawings are merely illustrative of one example of the invention.

Figure 1:
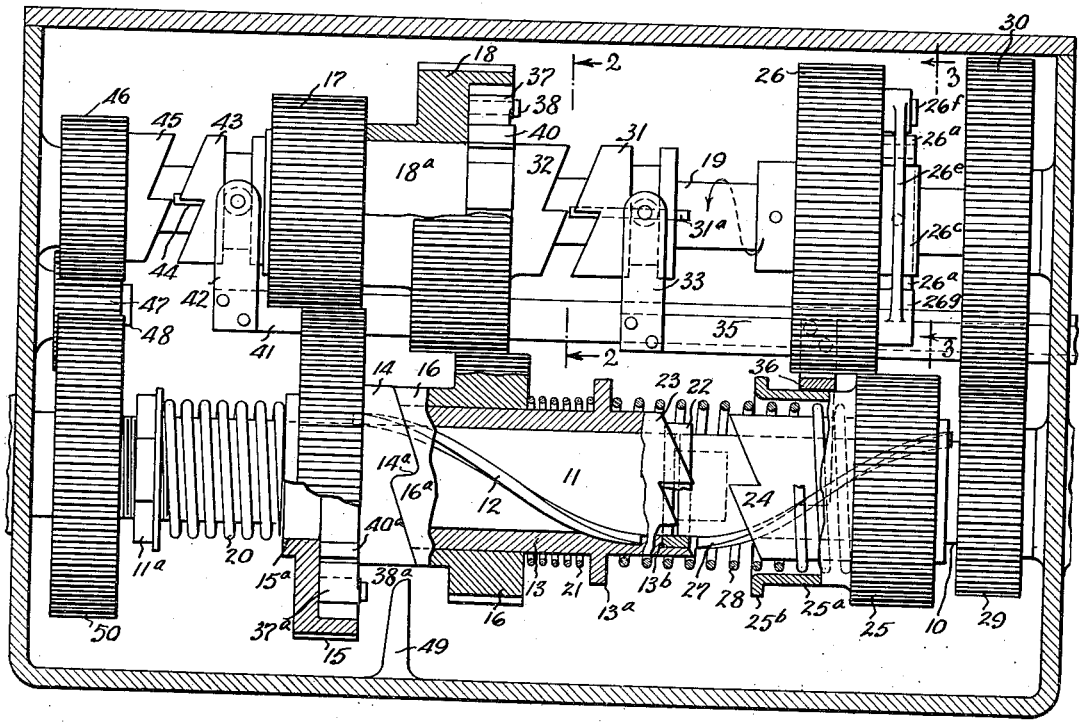
Figure 1 is a partly sectional side elevation of a transmission gear embodying my invention, showing the gear in neutral position.

In the illustrated example of my invention, the numeral 10 indicates a drive shaft and 11 a driven shaft, said shafts having suitable bearings in a casing A. The driven shaft 11 is formed with one or more spirals 12, and fitted to said shaft and spiral or spirals is a sleeve 13. Rigid with the sleeve 13 is a clutch element 14 and loose on sleeve 13 and clutch element 14 is a ring gear 15. The element 15 is a low gear drive. Loose on the sleeve 13 is a second intermediate gear element 16. The element 14 and the gear element 16 have, respectively, clutch teeth $14^a$, $16^a$ rigid therewith.

A drive gear element 17 meshes with the ring gear 15 and is integral with a sleeve $18^a$ loose on a counter shaft 19 having a ring gear 18 thereon. The ring gear elements 15 and 18 may turn relatively to the hubs of the gear element $14^a$ and sleeve $18^a$ respectively.

Coiled about the driven shaft 11 is a spring 20, abutting at one end against the hub of the gear element 14, and abutting at its other end against a ring nut or collar $11^a$ on said shaft 11. A spring 21 is coiled about the sleeve 13 between the intermediate drive gear element 16 and a flange or collar $13^a$ on the said sleeve. 22 indicates a collar on shaft 11, against which a shoulder $13^b$ on sleeve 13 bears.

On that end of the sleeve 13 adjacent to the drive shaft 10 is a clutch element 23, opposed to which is a slidable clutch element 24 integral with a speed gear wheel 25 which meshes with a gear wheel 26 on counter shaft 19. The rim of the gear wheel 26 is loose on the hub of said gear wheel, and associated with said rim is a brake or retarder as follows: A curved brake member $26^a$ is pivoted at one end as at $26^b$ to the hub $26^c$ fast on the shaft 19, and partially embraces said hub. The opposite end of said brake element $26^a$ is pivotally secured as at $26^d$ to a governor lever $26^e$ which is pivotally secured as at $26^f$ to the rim of gear wheel 26, the opposite end of said lever being weighted as at $26^g$. The arrangement is such that as the gear wheel 26 acquires momentum, the centrifugal force will swing the weighted lever $26^e$ outwardly, thereby moving the brake element $26^a$ on its pivot $26^b$ and causing it to exert a braking action on the hub $26^c$, thereby retarding the element 26 relatively to the gear element 25. The clutch element 24 with its gear wheel 25 is sleeved on the drive shaft 10 and engaged therewith by a spiral rib or ribs 27, and normally said clutch element 24 is held out of engagement with the clutch element 23 by a spring 28 coiled about the adjacent ends of said clutch element 24 and sleeve 13. A gear element 29 is fast on the drive shaft 10 adjacent to the gear wheel 25 and meshes with a gear wheel 30 fast on the counter shaft 19 for driving the latter from the shaft 10.

For throwing the transmission gear into action, a slide clutch 31 is provided secured to the shaft 19 by a feather or key 31$^a$. Said clutch is adapted to be shifted to engage a mating clutch element 32 on the sleeve 18$^a$. For the purpose, a shift fork 33 engages the clutch 31 and is carried by a shift rod 35 which has a yoke 36 adjacent to a cylindrical flange 25$^a$ on the gear element 25, said flange 25$^a$ terminating in an annular flange 25$^b$ directed radially outward. Thus, the yoke 36, with the shifting of the rod 35 for throwing the clutch 31 into engagement, will be disposed adjacent to the flange 25$^b$ and allow the gear wheel 25 and clutch element 24 to move into engagement with element 23 against the tension of the spring 28.

Figure 2:
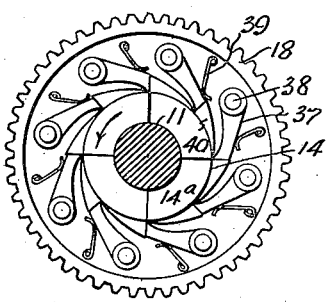
Figure 2 is a detail of cross section on the line 2—2 of Figure 1.
Figure 3:
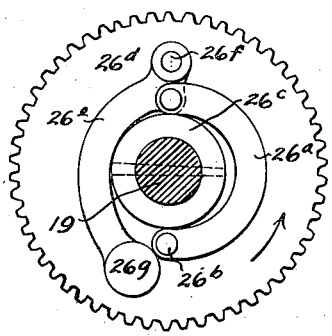
Figure 3 is a cross section on the line 3—3 of Figure 1.

For permitting movement of the ring gears 15 and 18 relatively to the hub of the gear element 14 and sleeve 18$^a$ respectively, the following means is employed in the illustrated form, reference being first had to the ring gear 18 and to Figures 1 and 2. A plurality of pawls 37 are disposed about the face of the element 18 and each is pivoted as by a pin 38, the pawls being acted upon by springs 39 tending to engage the pawls with ratchet teeth 40 on the periphery of the hub of the element 14 in the plane of the gear element 18. Similarly, the gear element 15 has pawls 37$^a$ corresponding in all respects with pawls 37 and pivoted as at 38$^a$, said pawls engaging ratchet teeth 40$^a$ on the hub of the element 14.

With the described arrangement, upon the clutch 31 being engaged with the clutch element 32, the sleeve 18$^a$, and with it the gear elements 18 and 17, will be driven, the element 18 in turning driving the intermediate gear element 16 with which it meshes. The ring gear 15 of the sleeve element 14 can at this time have relative turning movement about the hub of said gear element 14 by reason of the pawls 37$^a$ and ratchet teeth 40$^a$, the pawls slipping. Thus, the sleeve element 14, with its gear ring 15, and the gear element 16 will all turn, but the drive will be through the element 16, the ring gear 15 slipping. If the resistance is too great to start under the intermediate gear 16, the sleeve 13, by reason of the rib or ribs 12, will move on the driven shaft 11, but a stop 49 is provided in the path of the gear element 16, limiting its sliding movement, so that with the continued movement of the sleeve 13 by reason of the spiral 12, the connection between 14$^a$ and 16$^a$ will be broken and this will leave the gear element 16 running free, and the drive will now be through the gear 17 and low gear 14, 15. With the gear element 17 driving, the gear element 16 may turn relatively to gear 15 by reason of the disconnection at 14$^a$, 16$^a$. The clutch elements 14$^a$, 16$^a$, it will be observed, are slightly angular at the engaging surfaces to facilitate the separation under a heavy resistance and by yielding of the spring 21.

As momentum is acquired under the intermediate gear drive, the retarding device on the gear wheel 26 will come into action under centrifugal force of the lever 26$^e$, and the brake element 26$^a$ will engage against the hub 26$^c$ and retard the turning of the element 26 about said hub. The retardation of the element 26 will give a relatively increased movement to the element 25, and by reason of the spiral rib or ribs 27, said element 25 will advance toward the sleeve 13, the spring 28 yielding until the clutch 24 engages the clutch element 23, thereby driving the shaft 11 from the shaft 10 under direct high speed drive.

For reversing, a shift rod 41 is provided, having a fork 42 engaging a clutch 43 on the shaft 19 adjacent to, but separate from, the gear 17. The clutch 43 is secured by a spline 44 to shaft 19 and is adapted to engage a clutch element 45 on a gear 46 loose on the shaft 19, said gear element 46 meshing with an intermediate gear 47 on a stud shaft 48, said intermediate gear in turn meshing with a gear element 50 on the driven shaft 11.

I would state in conclusion that while the illustrated example constitutes a practical embodiment of my invention, I do not limit myself strictly to the mechanical details herein illustrated, since manifestly the same can be considerably varied without departure from the spirit of the invention as defined in the appended claims.

Having thus described my invention, I claim:

1. A transmission gear, including a drive shaft, a driven shaft and interposed gearing adapted to function for different speeds, said gearing including an automatic shift gear assemblage comprising a low gear and an intermediate gear element, and manually controlled means to bring the intermediate gear element into action and simultaneously turn the low gear, said low gear and intermediate gear being adapted to separate under undue resistance offered under the intermediate drive.

2. A transmission gear, including a drive shaft, a driven shaft and interposed gearing adapted to function at different speeds, said gearing including an automatic shift assemblage comprising a low gear element and an intermediate gear element, drive elements to actuate the low gear and intermediate gear elements, and means to cause a separation of the low gear and intermediate gear elements under undue resistance.

3. A transmission gear, including a drive shaft, a driven shaft and interposed gearing adapted to function at different speeds, said gearing including an automatic shift assemblage comprising a low gear element and an intermediate gear element, drive elements to actuate the low gear and intermediate gear elements, and means to cause a separation of the low gear and intermediate gear elements under undue resistance, said low gear element being adapted to slip on its hub when the drive is through the intermediate gear element, and said actuating gear elements for the drive for the low and intermediate gear being adapted to relative movement.

4. A transmission gear, including a drive shaft, a driven shaft and interposed gearing adapted to function for different speeds, said gearing including an automatic shift gear assemblage comprising a low gear and an intermediate gear element, and manually controlled means to bring the intermediate gear element into action and simultaneously turn the low gear, said low gear and intermediate gear being adapted to separate under undue resistance offered under the intermediate drive; together with a high gear direct drive element, and means to automatically throw into direct drive as momentum is acquired under intermediate drive.

5. A transmission gear, including a drive shaft, a driven shaft, a sleeve on the driven shaft, intermediate and low gear elements on said sleeve, means tending to clutch said low gear and intermediate gear elements with each other, a counter shaft, gearing means on said shaft adapted to actuate the low gear and intermediate gear elements, and means to drive said counter shaft from the drive shaft, said low gear and intermediate gear being adapted to separate under undue resistance under the intermediate gear drive.

6. A transmission gear, including a drive shaft, a driven shaft, a sleeve on the driven shaft, intermediate and low gear elements on said sleeve, means tending to clutch said low gear and intermediate gear elements with each other, a counter shaft, gearing means on said shaft adapted to actuate the low gear and intermediate gear elements, and means to drive said counter shaft from the drive shaft, said low gear and intermediate gear being adapted to separate under undue resistance under the intermediate gear drive; together with a gear element on the drive shaft, clutch members on said last mentioned gear element and said sleeve and normally disengaged, a gear on the counter shaft in mesh with the last mentioned gear, means to retard the last mentioned gear on the counter shaft under increased momentum, and means to cause a relative movement of said gear and the engaged gear and cause said clutches to engage for direct high speed drive.

7. A transmission gear, including a drive shaft, a driven shaft and interposed gearing adapted to function at different speeds, said gearing including an automatic shift assemblage comprising a low gear element and an intermediate gear element, drive elements to actuate the low gear and intermediate gear elements, and means to cause a separation of the low gear and intermediate gear elements under undue resistance, the said low gear element having a gear ring separate from the hub of said element, the gear ring having spring pressed pawls adapted to engage ratchet teeth on the hub.

8. A transmission gear, including a drive shaft, a driven shaft and interposed gearing adapted to function at different speeds, said gearing including an automatic shift assemblage comprising a low gear element and an intermediate gear element, drive elements to actuate the low gear and intermediate gear elements, and means to cause a separation of the low gear and intermediate gear elements under undue resistance, the gear rim of the low gear element being adapted to slip relatively to its hub when the intermediate gear element is driving, and the drive gear element of the intermediate gear element having a rim adapted to slip on its hub when the low gear element is driven.

CLAUDE BEARENS.